May 3, 1960 H. SCHOEPE 2,934,974
FEED MECHANISM HAVING A MANUAL OVERRIDE
Filed Oct. 21, 1957 4 Sheets-Sheet 1

INVENTOR.
HARRY SCHOEPE
BY Hudson, Coughton,
Williams, David & Hoffmann
ATTORNEYS

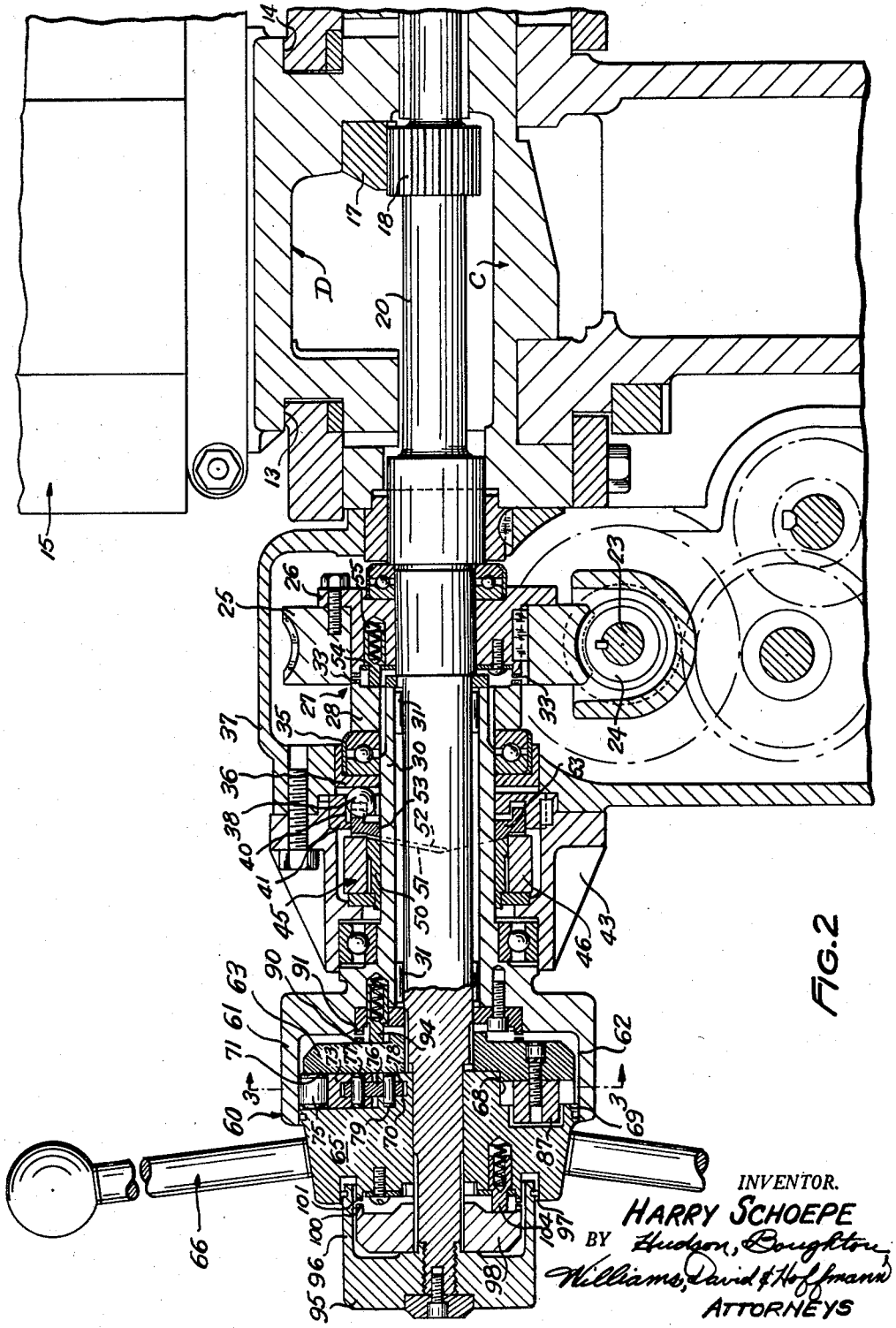

May 3, 1960  H. SCHOEPE  2,934,974
FEED MECHANISM HAVING A MANUAL OVERRIDE
Filed Oct. 21, 1957  4 Sheets-Sheet 3
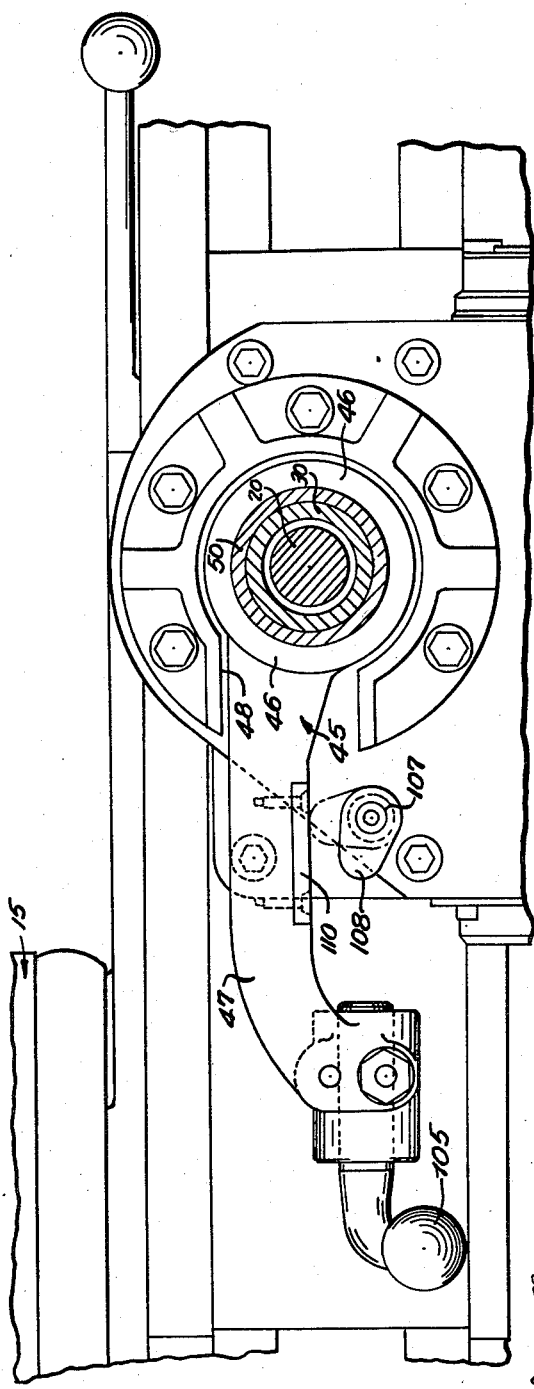
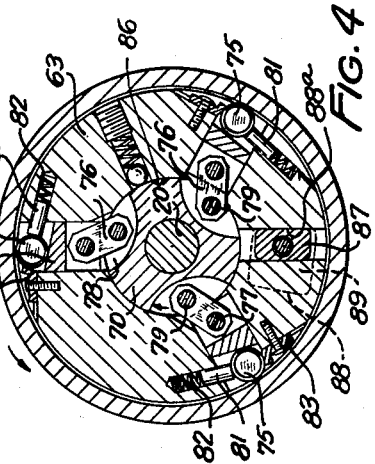
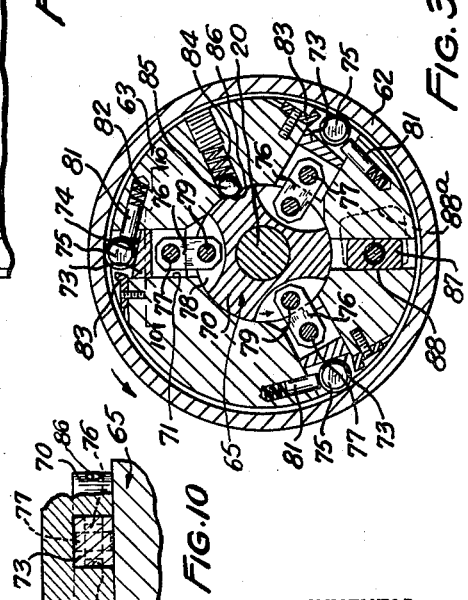
INVENTOR.
HARRY SCHOEPE
BY Hudson Boughton,
Williams, David & Hoffmann
ATTORNEYS May 3, 1960 H. SCHOEPE 2,934,974
FEED MECHANISM HAVING A MANUAL OVERRIDE
Filed Oct. 21, 1957 4 Sheets-Sheet 4
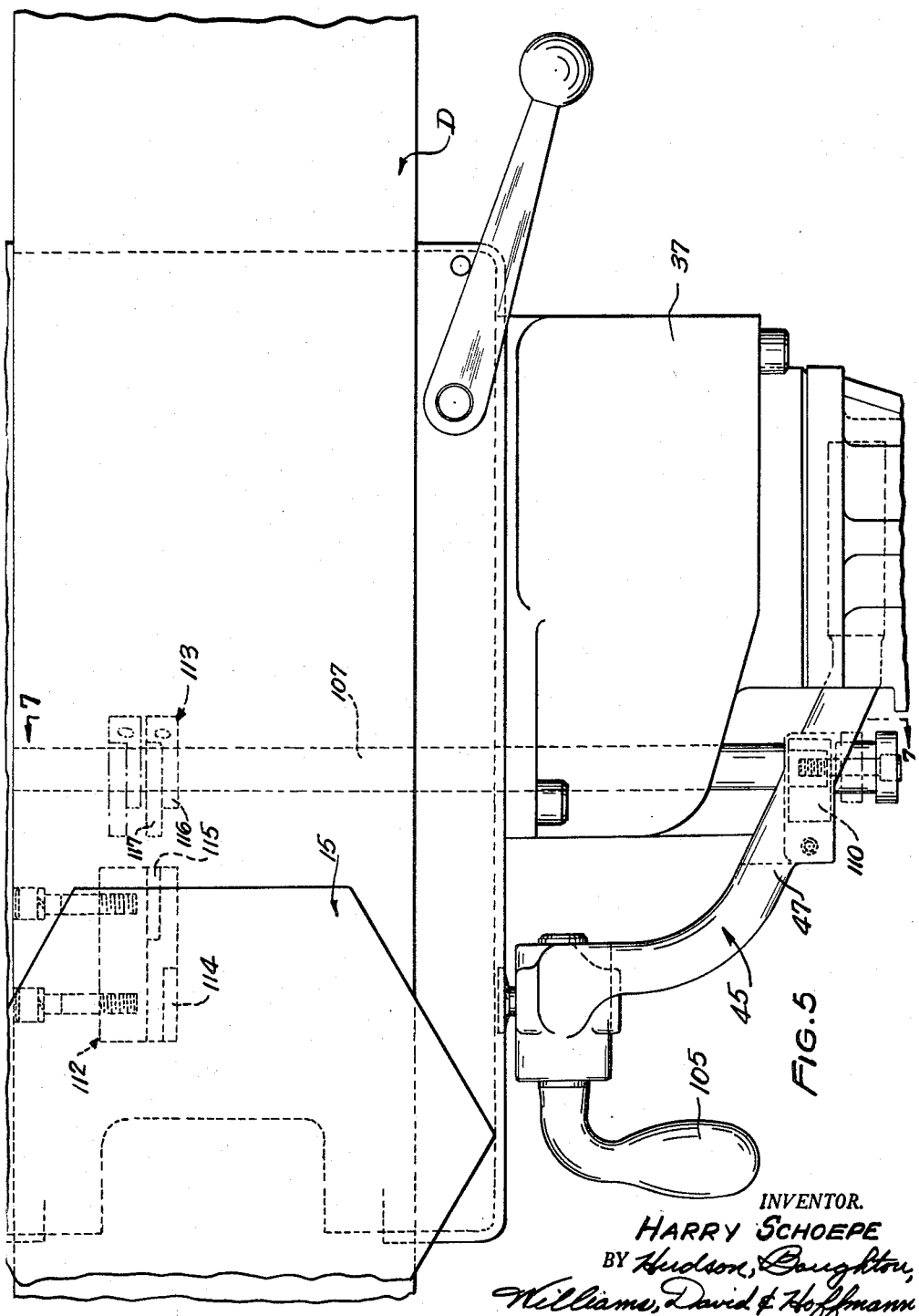
INVENTOR.
HARRY SCHOEPE
ATTORNEYS United States Patent Office 2,934,974
Patented May 3, 1960

2,934,974

FEED MECHANISM HAVING A MANUAL OVERRIDE

Harry Schoepe, Cleveland, Ohio, assignor to The Warner & Swasey Company, Cleveland, Ohio, a corporation of Ohio Application October 21, 1957, Serial No. 691,335

20 Claims. (Cl. 74—625)

The present invention relates to machine tools and, more particularly, to a drive for moving a machine tool element, such as a tool slide, relative to its supporting member.

There are times during the operation of a machine tool when it is desirable to effect movement of a machine tool element being driven by a power drive in a manner different from the movement caused by the power drive without stopping the operation of the drive. For example: A turret lathe is often used to drill a hole in a workpiece and when this is done the drill is usually carried by the turret slide and moved toward the spindle to engage and drill the workpiece by a power drive which effects movement of the turret slide at a predetermined rate of speed. During the drilling operation it is sometimes necessary to withdraw the tool from the hole being drilled to clean the chips from the hole and then to return the tool to a drilling position from which it will be again fed forwardly by the power drive. It is desirable, therefore, that the drive to the turret slide be such that the tool can be readily withdrawn and subsequently returned to its drilling position. Similar situations will be apparent to those skilled in the art where it is desirable to override the power drive which is operating to effect movement of a machine tool element.

An important object, therefore, of the present invention is to provide a new and improved machine tool in which means is provided for easily and conveniently overriding the power feed for moving an element of the machine tool so that the element may be selectively moved in a direction opposite to its direction of movement by the power feed or in the same direction as the power feed, but at a faster rate.

Another object of the present invention is to provide a new and improved machine tool in which a power-actuated drive for a machine tool element includes a member which is rotatable in one direction to both release the drive and move the element at a speed dependent upon the speed of rotation of the member and which is rotatable in the opposite direction to overrun the power-actuated drive to the element.

A further object of the present invention is to provide in a machine tool a new and improved combined overrunning clutch and release coupling in the drive for a machine tool element to enable the element to be moved at a faster rate than the rate effected by operation of the drive or to be moved in a direction opposite to the direction of movement effected by the drive without stopping the drive.

A still further object of the present invention is to provide a new and improved combined overrunning clutch and release coupling in which a power driven member is connected in driving relationship with a second member to be driven by clutch means constructed to permit the second member to overrun the power driven member when the second member is driven at a faster rate than, and in the same direction, as the power driven member and including a control member which is actuatable from a first position wherein the clutch means is operable as an overrunning clutch to a second position wherein the clutch means is disengaged and inoperative and in which a third member is connected to the second member by a lost motion connection for connecting the members in driving relationship and which permits relative movement between the second and third members when the direction of drive therebetween is reversed from a first relative position for driving in one direction and a second relative position for driving in the opposite direction, the third member being connected to the control member of the clutch means to hold the clutch means in an engaged position when the second member is driving the third member and to move the control member to a clutch disengaged position when the third member is moved relative to the second member to a position when the lost motion connection is engaged to drive the second member in the opposite direction to that which it is driven by the feed.

Yet another object of the present invention is to provide a new and improved machine tool having a drive for a machine tool element including a combined overrunning and release coupling of the type referred to above and wherein means is provided for locking the overrunning clutch and release coupling to the power-actuated drive to render the clutch and coupling ineffective to overrun or release the power drive.

It is a further object to provide, in a machine tool, a control member for an element, such as the turret of a turret lathe, which is operable to control all movements of the element including the starting and stopping of the power actuated movements and manual movements which are made independently of the power drive for the member.

It is also an object of the present invention to provide in a machine tool a new and improved turnstile actuated mechanism for actuating a movable machine tool element being driven by the power drive therefor, the turnstile being operable by the machine tool operator to move the element in a direction opposite to that direction in which the power drive is moving the element or in the same direction as that of the power drive but at a faster rate and to stop the movement of the element.

A further object of the present invention is to provide in a machine tool a new and improved drive for a machine tool member which includes a selectively drivable power actuated member connected to drive the element in one direction by a mechanism controlled by a manually operable member which can be manipulated to override the power drive, to release the power drive to move the element in a direction opposite to that in which it is moved by the power drive and in which a drive for the selectively drivable power actuated member may be engaged by the operation of the manually operable member and is disengaged automatically.

Further objects and advantages of the present invention will be apparent from the following detailed description of the preferred embodiment thereof made with reference to the accompanying drawings forming a part of this specification for all matter shown therein, even though not expressly described, and in which:

Fig. 2 is a fragmentary sectional view showing a portion of the drive for the turret slide and taken approximately along line 2—2 of Fig. 1;

Fig. 3 is a sectional view taken approximately along line 3—3 of Fig. 2;

Fig. 4 is a sectional view similar to Fig. 3 but showing the parts thereof in a different operating condition;

Fig. 5 is a fragmentary plan view of a portion of the machine of Fig. 1 showing the turret slide and the housing for the drive mechanism of Fig. 2;

Fig. 6 is a front elevational view of the portion of the machine shown in Fig. 5 with a part thereof cut away;

Fig. 10 is a fragentary sectional view taken approximately along line 10—10 of Fig. 3.

Figure 1:
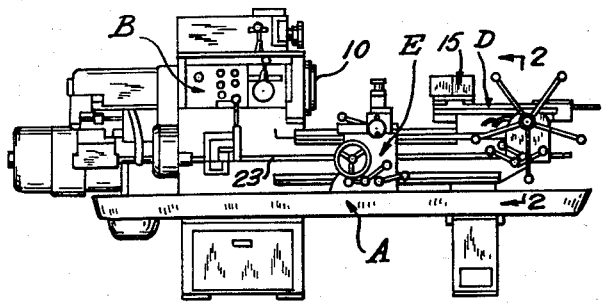
Fig. 1 is a front elevational view of a turret lathe embodying the present invention in the drive for the turret slide.

The present invention is susceptible of various modifications and constructions and of use in various power drives where it is desirable to overrun or release the power drive to move the element independently of the drive end in an overrunning manner in the same direction or in the opposite direction to that effected by the drive. In the preferred embodiment, however, the invention is embodied in the drive to the turret slide of a turret lathe where it is often necessary to withdraw the tool being fed by the operation of the drive to the turret lathe and to subsequently return the tool to its working position, preferably without stopping the power drive.

Referring to the drawings, the turret lathe shown therein comprises a bed A, a headstock B at one end of the bed A and including a rotatable spindle 10 for clamping and rotating a workpiece, a turret saddle C supported on ways on the bed A for movement toward and away from the spindle 10, and a turret slide D supported on longitudinal ways 13, 14 formed on the saddle C for movement toward and away from the headstock B along a line parallel to the spindle axis. The turret lathe may also be provided with the conventional cross slide carriage E but which, in the illustrated machine, forms no part of the present invention.

The turret slide D is movable by power along the ways 13 and 14 to move a conventional turret 15 supported thereon toward the work spindle 10. The turret 15 is shown as a hexagonal turret having six faces for mounting tools and which may be indexed to sequentially move the tools to a position facing the headstock B and the spindle 10.

The drive for moving the turret slide D along the ways 13 and 14 includes a rack 17 fastened to the bottom of the turret slide D and continuously in mesh with a pinion 18 formed on a shaft 20 extending transversely of the bed A. The rack 17 extends longitudinally of the bed A parallel to the axis of the spindle 10 and rotation of the shaft 20 to rotate the pinion 18 causes the turret slide D to move along the ways 13 and 14 in a direction dependent upon the direction of rotation of the shaft 20.

The shaft 20 is journaled in the saddle C and is rotated from the main drive for the turret lathe to move the slide D forward. The main drive is not shown and will not be described in detail since it may be a conventional drive and per se forms no part of the present invention, and suffice it to say that the main drive rotates a shaft 23 which extends longitudinally of the bed A. The shaft 23 is connected to rotate the shaft 20 through a drive mechanism which includes a worm 24 slidably keyed to the shaft 23 and continuously in mesh with a worm gear 25. The worm gear 25 is carried by a clutch member 26 supported coaxially on the shaft 20 and freely rotatable with respect thereto. The clutch member 26 forms one element of a clutch 27, the other clutch element of which is a member 28 splined to a sleeve 30 supported coaxially on the shaft 20 for rotation with respect thereto by needle bearings 31. The sleeve 30 is freely rotatable with respect to the shaft 20 and rotates with the clutch member 28 by reason of the spline connection therebetween.

The spline connection between the clutch member 28 and the sleeve 30 permits the clutch member 28 to be moved axially toward the clutch member 26 to engage clutch teeth 33 formed on the adjacent ends of the clutch members 26, 28. Engagement of the teeth 33 causes the clutch member 28 and, in turn, the sleeve 30 to rotate on the shaft 20 together with the clutch member 26 upon rotation of the latter.

A thrust bearing 35 is supported for axial movement on the sleeve 30 adjacent the end of the clutch member 28 remote from the clutch member 26, the left-hand end of the clutch member 28 as viewed in Fig. 2. The thrust bearing 35 is positioned in a cup-like member 36 positioned in a bore in a housing 37 for the clutch 27 and thrust bearing 35, and the bottom of the cup-like member 36 extends radially adjacent the left-hand end of the thrust bearing 35 as the latter is viewed in Fig. 2. The outer side of the bottom of the cup-like member 36 is engaged by a plurality of balls 38 only one of which appears in the drawing positioned within recesses in a ring 41 about the sleeve 30. The ring 41 is clamped against the housing 37 for the worm gear 25 by a tubular housing member 43 bolted to the front side of the housing and having a central opening coaxial with the bore in which the thrust bearing 35 is positioned.

When the balls 38 are moved axially toward the clutch member 28 and the thrust bearing 35, the balls impart axial movement to the thrust bearing 35 and the clutch member 28 to engage the latter with the clutch member 26 so that the sleeve 30 rotates with the clutch member 26. The balls 38 are moved axially by the operation of a feed lever 45 having an annular portion 46 encircling the sleeve 30, and the shaft 20 and an arm portion 47 extending outwardly through an opening 48 in the tubular housing member 43. An annular cam member 50 is disposed intermediate the sleeve 30 and the annular portion 46 of the feed lever 45 and fits within the annular portion 46 in such a manner that rotation of the feed lever 45 causes rotation of the cam member 50 with respect to the sleeve 30. The cam member 50 has a cam surface 51 which cooperates with a cam surface 52 on an annular cam member 53 axially movable on the sleeve 30 and disposed between the cam member 50 and the ring 41 and having portions which extend into engagement with the balls 38 to move the latter axially when the cam member 53 moves axially. The cam surfaces 51, 52 cooperate to move the member 53 axially when the feed lever is rotated to a clutch engaged position. When the feed lever 45 is rotated to release the clutch member 28 the member 28 is moved to a disengaged position by spring biased plungers 54 disposed in bores 55 in the clutch member 26 and extending outward thereof to engage the adjacent side of the clutch member 28. The plungers urge the clutch member 28 axially in a direction away from the clutch member 26.

The structure of the drive for the turret slide D thus far described is conventional and has, therefore, not been shown or described in detail. Insofar as the present invention is concerned, suffice it to say that when the feed lever 45 is rotated from a first position, where the clutch 27 is disengaged, to a second position, the balls 38 are moved axially to effect engagement of the clutch 27 and when the feed lever 45 is returned to the first position, the clutch 27 is disengaged by the action of the plungers 54 and that when the clutch is engaged, the sleeve 30 is connected to the gear 25 and, in turn, to the shaft 23 for rotation therewith.

In the conventional type of drive the sleeve 30 would be connected to the shaft 20 for rotation therewith so that when the clutch 27 is engaged the shaft 20 is driven in a direction and at a rate dependent upon the direction and rate of rotation of the shaft 23. According to the present invention, however, the sleeve 30 is supported for rotation with respect to the shaft 20 and a combined overrunning clutch and release coupling 60 is provided for interconnecting the sleeve 30 and the shaft 20. The sleeve 30 has an enlarged circular cup-like portion 61 at its outer end, the left-hand end thereof as viewed in Fig. 2. The shaft 20 extends outwardly through the enlarged portion 61 and mechanism is provided for connecting the side wall 62 of the cup-like portion and, in turn, the sleeve 30 to the shaft 20. The mechanism includes an annular clutch plate 63 splined to the shaft 20 for axial movement with respect thereto and a hub 65 of a turnstile 66. The plate 63 is disposed within the portion 61 adjacent the inner side of the bottom of the cup and the hub 65 is disposed outwardly of the plate 63 on the shaft 20 and is rotatable with respect to the shaft.

The clutch plate 63 is counterbored to provide an annular recess 68 in the side 69 thereof adjacent the hub member 65, which recess communicates with the central opening through the plate 63 and receives a reduced portion 70 of the hub 65. The plate 63 also has a plurality of radially extending slots 71 which are angularly spaced from each other and which open into the annular recess 68. In the illustrated embodiment, the plate 63 has three slots 71 spaced 120° apart, each of which has a wedge member or shoe 73 positioned therein for sliding movement with respect to the plate 63. The shoes each have an outer inclined or wedge surface 74 which engages a respective roller 75 disposed intermediate the wedge surface 74 and the side wall 62 of the cup-like portion 61. Each of the shoes 73 is connected to the reduced portion 70 of the hub 65 by a respective toggle link 76 pivoted to the shoe and to the reduced portion 70. Each shoe 73 is bifurcated at its inner end to provide a yoke which straddles one end of the corresponding link 76 and is connected thereto by a pivot pin 77. The other ends of the links 76 are received in arcuate slots 78 in the reduced portion 70 of the hub 65. The arcuate slots 78 lie in a radial plane of the hub and permit the links to pivot about pins 79 which connect the links 76 to the hub and which pass through the side walls of the arcuate slots. The pivot pins for the links 76 extend parallel to the axis of the hub 65 and plate 63.

The wedge surfaces 74 of the shoes 73 are inclined so that when the rollers 75 thereon move in a counterclockwise direction with respect to the wedge surface 74, as the latter are viewed in Fig. 3, the rollers roll uphill and are moved outwardly toward the side wall 62 of the cup-like portion 61. The rollers 75 are each urged counterclockwise by a respective spring-biased plunger 81 supported in an individual bore communicating with the corresponding slot 71 in the plate 63 and extending outwardly of the bore to engage the ball. The plungers 81 are urged outwardly of their bores by individual springs 82 positioned in the bottoms of the corresponding bores.

The plate 63 is cut away adjacent the side of the slot at the high end of the wedge surface 74 therein and a stop 83 is fastened to the plate 63 in each of the cut-out portions. The rollers 75 engage the stops 83 when they are at the high points of their corresponding wedge surfaces 74.

When the clutch 27 is engaged the enlarged portion 61 of the sleeve 30 is driven in a counterclockwise direction, as the latter is viewed in Figs. 3 and 4, and the turret slide D will move toward the work spindle, provided power is transmitted from the sleeve 30 through the combined overrunning clutch and release coupling 60 to the turret slide D. If the links 76 extend radially of the shaft 20 power will be transmitted from the side wall 62 through the rollers 75 to the plate 63 to rotate the shaft 20. The rollers 75 are urged up the cam surface 74 due to the action of the spring plungers 81 and the rotation of the side wall 62 tends to wedge the rollers 75 against the wedge surfaces 74, as long as the links 76 are radially disposed, to cause the plate 63 to rotate with the sleeve 30 and the enlarged portion 61.

The plate 63 is provided with a radially extending bore 84 in the same plane as the slots 71 in which a detent ball 85 is positioned and which cooperates with a recess 86 in the reduced portion 70 of the hub 65 to yieldably hold the plate 63 and the hub 65 in a relative position where the links 76 extend radially, to cause the turnstile 66 including the hub 65 to normally rotate with the plate 63 and the shaft 20.

When the detent ball 85 is positioned in the recess 86, the links 76 extend radially with respect to the axis of rotation and the wedge members 73 are in their outermost radial position. With the clutch plate 63 and the hub portion 70 in this relative position a boss 87 carried by the clutch plate 63 is positioned adjacent a side wall 88 of a recess 89 in the hub 65. The boss 87 extends axially from the left-hand side of the clutch plate 63, as it is viewed in Fig. 2, and the recess 89 is formed in the adjacent side of the hub 65. The wall 88 of the recess 89 is the left-hand wall of the recess, as the latter is viewed in Figs. 3 and 4, and if the turnstile 66 is rotated in the direction that it is driven by the sleeve 30 to move the hub relative to the clutch plate 63, the side wall 88 will engage the boss 87 and effect movement of the clutch plate 63 with the turnstile 66 in the same direction as the clutch plate is driven by the sleeve 30.

If the turnstile 66 and, in turn, the hub portion 70 are rotated at a faster angular rate than the rate at which the clutch plate 63 is being driven by the sleeve 30 through the side wall 62 and the rollers 75, the engagement of the side wall 88 with the boss 89 will cause the clutch plate to rotate relative to the side wall 62 to force the rollers 75 down the inclined surfaces 74 to move the latter out of driving engagement with the side wall 62 against the action of the spring-biased plungers 81. The rollers 75 at this time function as an over-running clutch means to permit the clutch plate 63 and, in turn, the shaft 20 to be rotated at a faster rate than that produced by the power drive through the side wall 62 of the sleeve 30. If the operation of the turnstile 66 is stopped, the spring-biased plungers 81 will again urge the roller 75 to a position where the rotation of the sleeve 30 and the side wall 62 will effect the wedging action against the wedge surface 74 to drive the clutch plate 63 with the sleeve 30.

If a holding force is applied to the turnstile 66 while the sleeve 30 is being driven, the ball detent 86 will release and the recess 89 will permit the clutch plate 63 to move relative to the hub 65 of the turnstile 66 until the boss 87 engages the right-hand side wall 88a of the recess 89 as the latter is viewed in Figs. 3 and 4. This amount of relative rotation between the clutch plate 63 and the hub 65 will cause the links 76 to break from a radial position and to assume a position shown in Fig. 4. When the links 76 break, the wedge members 73 move radially inwardly to a position where the rollers 75 permit relative rotation of the side wall 62 of the sleeve 30 with respect to the clutch plate 63 without effecting a wedging of the rollers 75 to produce a driving connection even though the rollers move to their most radially outward point on the wedge members. The clutch means provided by the rollers 75 and the associated structure is, therefore, released and the hub 65 and, in turn, the shaft 20 may then be rotated in the direction opposite to its direction of movement by the sleeve 30 to retract or return the turret slide. The clutch plate 63 will move with the hub 65 by reason of the engagement of the right-hand side wall 88a with the boss 87.

It can be seen then that by holding the turnstile 66, the drive from the shaft 23 to the turret slide D is decoupled and if the shaft 20 is now rotated by operation of the turnstile 66 in a clockwise direction as viewed in Figs. 3 and 4, the links 76 will remain broken and the turret slide will be moved in the direction opposite to the direction that it was being driven by the shaft 23 through the sleeve 30.

It can now be seen that the present invention provides a power drive for a machine tool element including a member which can be operated to move the slide in either direction and when operated, decouples the power drive when necessary, and which is also operative to recouple the power drive after it has been decoupled.

At times it is desirable to lock up the power drive to render the turnstile 66 ineffective to decouple or overrun the power drive. To this end the inner side of the plate 63 adjacent the bottom of the cup-shaped portion 61 is provided with clutch teeth 90 that are engageable with cooperating clutch teeth 91 formed on a member set in the bottom of the cup-shaped portion 61 by axial movement of the plate 63. Engagement of the teeth 90, 91 connects the sleeve 30 directly to the plate 63 to effect rotation of the shaft 20. The clutch teeth 90, 91 are urged to a disengaged position by spring biased plungers 94, supported in the bottom of the cup-shaped portion 61 and extending outwardly thereof into engagement with the plate 63 to urge the latter away from the bottom of the cup-shaped portion 61. Only one of the spring biased plungers 94 appears in the drawings.

The clutch plate 63 is moved axially to engage the clutch teeth 90, 91 by the operation of a nut 95 threaded onto the outer end of the shaft 20. The nut 95 has an annular portion extending inwardly therefrom which portion is received in an annular groove 97 in the hub 65. The groove 97 permits axial movement of the nut 95 relative to the hub 65. Positioned within the annular portion 96 of the nut 95 is a clutch plate 98 having clutch teeth 100 formed on the side thereof adjacent the hub 65, and which are engageable with clutch teeth 101 on the hub to connect the hub 65 to the shaft 20 for rotation therewith.

When the nut 95 is threaded inwardly on the shaft 20, the clutch plate 98 is moved inwardly to engage the clutch teeth 100 thereon with the clutch teeth 101 on the hub 65 and after engagement of the clutch teeth 100, 101 continued rotation of the nut 95 causes the turnstile hub 65 to move axially to cause axial movement of the plate 63 to engage the clutch teeth 90, 91 to lock up the drive from the shaft 23 to the shaft 20.

The clutch formed by the clutch teeth 100, 101 is urged to a disengaged position by spring-biased plungers 104 carried by the hub 65 and which extend outwardly thereof into engagement with the clutch plate 98. The plungers urge the plate 98 in a direction away from the hub 65. When the nut 95 is threaded outwardly on the shaft to release the drive from its locked up condition, the spring-biased plungers 104, 94 function to disengage the clutch teeth 100, 101 and 90, 91 respectively so that the overrunning clutch and release coupling 60 may function in the manner described above.

The feed lever 45 for controlling the clutch 27 which connects the sleeve 30 to be driven from shaft 23 has operatively associated therewith a controlling handle 105. The structure of the lever 45 and the handle 105 and the manner of operation to rotate the cam member 50 are conventional and, per se, form no part of the present invention and reference is hereby made to patent 1,685,310 to Burrel for a detailed description of a feed lever similar to the feed lever 45. Suffice it to say that the handle 105 may be operated to move the lever 45 in a clockwise direction to a position where the clutch 27 is engaged and counterclockwise to a position where the clutch 27 is disengaged. The lever has associated therewith means for holding the lever in its clutch-engaged position.

During the operation of the machine the turret slide D is moved in a forward direction by engaging the clutch 27 to connect the shaft 20 to the shaft 23 through the overrunning clutch and release coupling 60 and the sleeve 30. When the turret slide D has completed the desired forward movement, the feed lever 45 is actuated, either manually or by an automatic stop mechanism, of suitable conventional design, to disengage the clutch 27 and stop the forward feed of the turret slide. The turnstile 66 is then operated to return the turret slide D to its back or rear position.

Figure 7:
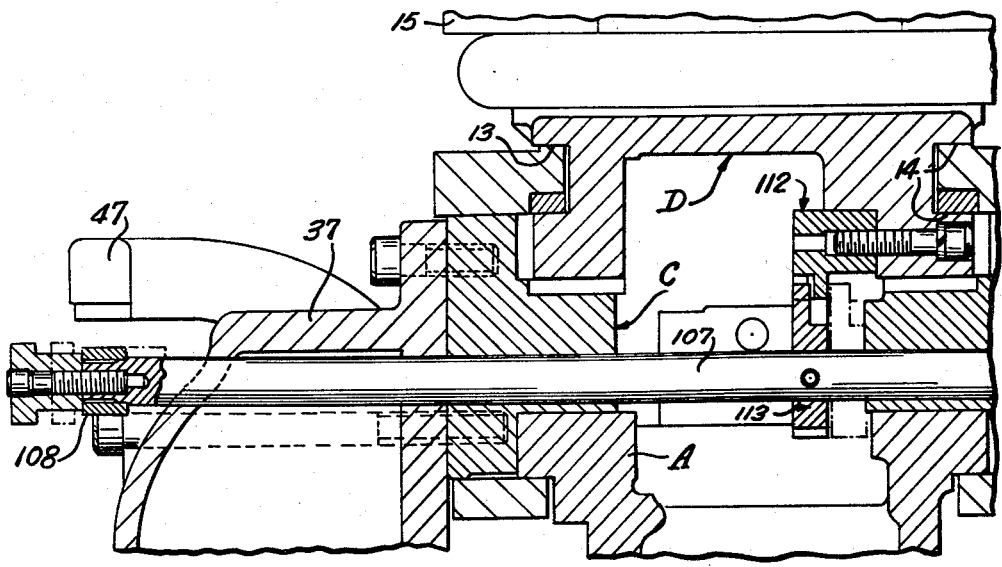
Fig. 7 is a fragmentary sectional view taken approximately along line 7—7 of Fig. 5.

An additional feature of the present invention is the provision of means for automatically effecting the engagement of the clutch 27 upon return of the turret slide to its rearmost or back position. Referring to Figs. 5, 6 and 7, it will be seen that a shaft 107 extends transversely of the bed A below the turret slide D and outwardly of the turret saddle below the feed lever 45. The outer end of the shaft 107 is disposed below the arm portion 47 of the lever 45 and the shaft 107 extends through the housing 37 and through the turret saddle above the ways on the bed A supporting the turret saddle. The shaft 107 is supported for limited axial movement with respect to the bed A and the housing 37 and also for limited rotation.

Figure 8:
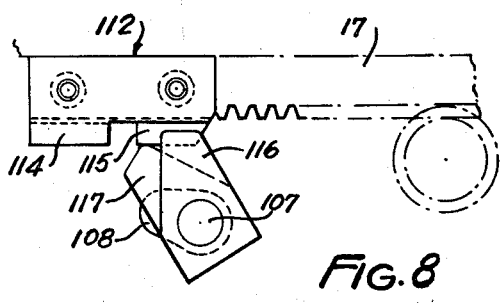
Figs. 8 and 9 are detail views of parts for automatically engaging and disengaging the drive to the turret.
Figure 9:
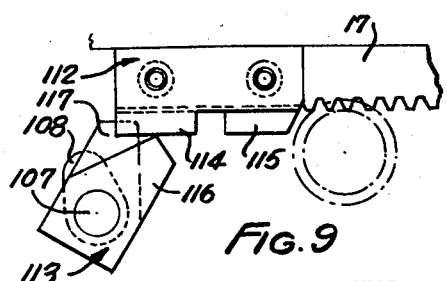

A cam 108 is fixed to the outer end portion of the shaft 107 and when the shaft is rotated in a counterclockwise direction from the position shown in Fig. 8 to that shown in Fig. 9, the cam 108 engages a plate 110 secured to the underside of the arm portion 47 of the feed lever 45 and lifts the feed lever 45 to its clutch-engaged position and locks the feed lever in the clutch-engaged position as long as the cam member 108 is in its rotated position shown in Fig. 9.

The turret slide D carries a cam block 112 which cooperates with a cam follower member 113 fixed to the shaft 107. The cam block 112 is adjacent to the end of the rack 17 and has depending cam portions 114, 115 which are laterally and longitudinally offset from each other and which respectively engage cam follower portions 116, 117 of the cam follower member 113 to rotate the shaft 107. As the turret slide D is moved to its rearmost or back position, the cam portion 114 on the cam block 112 engages the cam follower portion 116 to rotate the cam portion 116 and, in turn, the shaft 107 to the position shown in Fig. 9. The cam portion 114 is such that the follower portion 116 remains in engagement therewith to hold the shaft 107 in its rotated position as long as the turret slide D is in its back position. As mentioned above, when the shaft 107 is rotated to the position shown in Fig. 9, the cam 108 thereon lifts the feed lever to its clutch-engaged position to engage the clutch 27 to effect the feed of the turret slide D. After the turret slide D is fed a predetermined distance forward from its back position, the cam portion 115 of the cam block 112 engages the follower portion 117 which extends vertically from the shaft 107 when the shaft is in its rotated position shown in Fig. 9 to move the shaft counterclockwise to the position shown in Fig. 8 to rotate the cam 108 out of engagement with the feed lever 45 and to permit the feed lever to be manually moved to a clutch-disengaged position or moved by the operation of automatic stop means.

It can be seen from the above description that for an initial portion of the feed movement of the turret slide, the feed lever, in the preferred and illustrated embodiment, cannot be moved to a clutch-disengaged position. It is conventional for the turret indexing mechanisms to require the turret slide E to be moved a short distance forward after each indexing operation before the turret E can be again indexed to present a new face to the work spindle. Preferably the initial portion of the travel of the turret slide where the clutch 27 cannot be disengaged is that portion of the travel necessary to condition the indexing parts for the turret to permit the indexing of the turret E when the turret is returned to its back position.

The shaft 107 is supported for axial movement so that the cam follower member 113 may be moved axially inwardly to a position where the follower portions therein will not be engaged by the cam portions of the cam block 112. With the shaft 107 shifted inwardly the feed lever 45 is operated in a conventional manner to control the operation of the turret slide D.

When the shaft 107 is in its operative position, the clutch 27 will be automatically engaged whenever the turret 15 is moved to its back position. In the illustrated machine, the turret is moved to its back position by operating the turnstile 66 and, as described above, when the turnstile 66 is operated to return the turret, the overrunning clutch mechanism between the sleeve 30 and the shaft 20 is released. Therefore, the engagement of the clutch 27 when the turret is returned to its back position will not effect rotation of the shaft 20 to move the turret forward until the turnstile 66 is returned by the operator to a position where the links 76 extend substantially radially of the shaft 20 to effect reengagement of the overrunning clutch mechanism which includes the rollers 75.

It can now be seen that the operator of the machine may control the movements of the turret by operating only the turnstile 66. As stated above, the clutch 27 is automatically disengaged at the end of its feed movement by any conventional mechanism well known to those skilled in the art, and at this point the operator can return the turret by operation of the turnstile and can again effect a forward feed movement of the turret by moving it to its rearmost position to engage the clutch 27 and by then operating the turnstile 66 to render the overrunning clutch connecting the sleeve 30 and the shaft 20 effective to transmit power. It is also pointed out that the operator can, during the feed movement, stop the feed movement of the turret, overrun the power feed for the turret, or move the turret in a return direction by operating the turnstile in the manner described above.

It can now be seen that the objects heretofore enumerated and others have been accomplished and that a new and improved drive for a movable machine tool element has been provided and while a preferred embodiment thereof has been described in considerable detail, it is hereby my intention to cover all modifications, constructions and arrangements which fall within the ability of those skilled in the art and the scope and spirit of the present invention.

Having thus described my invention, I claim:

1. In a driving mechanism for a machine tool element, a selectively drivable first rotatable member, a second rotatable member operatively connected to the machine tool element to be driven to drive the latter upon rotation of the second rotatable member, overrunning clutch means connecting said first rotatable member to drive said second rotatable member in a first direction upon rotation of the first rotatable member in a first direction, said clutch means comprising a wedge member carried by said second rotatable member adjacent said first rotatable member and a roller interposed between said wedge member and said first rotatable member and movable on said wedge member between a first position wherein said second rotatable member may overrun said first member and a second position wherein said roller is wedgeable against said wedge member to provide a force transmitting connection between said first member and said second member, and means supporting said wedge member for movement away from said first member to render said roller inoperative to form a driving connection therebetween, a third rotatable member actuatable in one direction to drive said second member in its said first direction and in the opposite direction to drive said second member in a direction opposite to its said first direction, and means responsive to a force applied to said third member and tending to produce movement of said third member relative to said second member in its said opposite direction to actuate said wedge member and release said clutch means.

2. In a drive mechanism for a machine tool element, a selectively drivable first rotatable member, a second rotatable member operatively connected to the machine tool element to be driven to drive the latter upon rotation of the second rotatable member, overrunning clutch means connecting the first rotatable member to drive said second rotatable member in a first direction upon rotation of the first rotatable member in a first direction and including a clutch control means having a clutch operative position wherein rotation of said first rotatable member is effective to drive said second rotatable member and wherein said second rotatable member can be driven in said first direction to overrun said first rotatable member and a clutch inoperative position wherein said clutch means is incapable of transmitting power from first rotatable member to said second rotatable member, a third rotatable member coaxial with said second rotatable member and actuatable in one direction to drive said second member in its said first direction to overrun said first member and in the opposite direction to drive said second member in a direction opposite to its said first direction, and toggle link means pivoted to said third rotatable member and connected to said clutch control means and responsive to a force applied to said third rotatable member tending to produce movement of said third rotatable member relative to said second rotatable member in said opposite direction to release said clutch means.

3. In a drive mechanism for a machine tool, the structure as defined in claim 2 wherein said clutch control means comprises a wedge member connected to said link means and carried by said second rotatable member adjacent said first rotatable member and said clutch means further comprises a roller interposed between said wedge member and said first rotatable member and movable on said wedge member between a first position wherein said second rotatable member may overrun said first member and a second position wherein said roller is wedgeable against said wedge member to provide a force transmitting connection between said first rotatable member and said second rotatable member, and means supporting said wedge member for movement away from said first rotatable member to render said roller inoperative to form a driving connection therebetween.

4. In a drive mechanism for a machine tool element, a selectively drivable first rotatable member, a second rotatable member operatively connected to the machine tool element to be driven to drive the latter upon rotation of the second rotatable member, overrunning clutch means for connecting the first rotatable member to drive said second rotatable member in a first direction upon rotation of the first rotatable member in a first direction and including a movable control means having a first position wherein said clutch means is operable to function as an overrunning clutch and a second position wherein said clutch means is incapable of providing a driving connection, a third rotatable member coaxial with said second rotatable member and having a relative position with respect to said second rotatable member wherein said third member moves with said second member, lost motion driving means interconnecting said second rotatable member and said third rotatable member whereby said third rotatable member when in said relative position is actuatable in one direction to drive said second rotatable member to overrun said first rotatable member and in the opposite direction to drive, after lost motion movement relative to said second rotatable member, said second member in a direction opposite to its said one direction, and means responsive to said lost motion movement between said third and second rotatable members to actuate said control means comprising a toggle link connected to said clutch control means and pivoted to said third rotatable member.

5. In in a machine tool having a machine tool element to be moved forward from an initial position to effect a feed movement and to be returned to the initial position, a first rotatable member, means for rotating said member, a second rotatable member coaxial with said first rotatable member and operatively connected to said element to effect movement of the element in a feed direction when the second rotatable member is rotated in a first direction and in a return direction when the second rotatable member is rotated in a second direction, lost motion driving means connecting said first rotatable member to drive said second rotatable member in either of said first and second directions by rotation of the first rotatable member and said members having first and second relative angular positions when said second member is driven by the first rotatable member in said first and second directions respectively, a rotatable power driven member, overrunning clutch means connecting said power driven member and said second rotatable member to drive said second rotatable member in its said first direction upon rotation of said power driven member, said clutch means including control means carried by said second rotatable member and having an operative position wherein said overrunning clutch means is capable of transmitting power and a second position wherein said clutch means is incapable of transmitting power, actuating means interconnecting said control means and said first rotatable member and operable to actuate said control means to its second and operative positions when said second rotatable member and the first rotatable member are moved respectively to their said second relative angular position and a relative angular position different from said second relative angular position comprising a toggle link pivoted to said first rotatable member and extending radially of the axis thereof when said first and second members are in their said first angular position, and releasable means for effecting rotation of said second and first rotatable members as a unit when in said different relative angular position in the absence of a force applied to said first rotatable member tending to move said first rotatable member to drive said second rotatable member in its said second direction.

6. In a machine tool, the structure as defined in claim 5 wherein said control means comprises a wedge member carried by said second member adjacent said power driven member and said clutch means further comprises a roller interposed between said wedge member and said power driven member and movable on said wedge member between a first position permitting the overrunning of said power-driven member by said second rotatable member and a second position wherein said roller is wedged between said power driven member and said wedge member to provide a force transmitting connection between said power driven member and said second rotatable member, and means supporting said wedge member for movement away from said power driven rotatable member to a position rendering said roller inoperative to form a driving connection between said power driven member and said second rotatable member, said toggle link being pivoted to said wedge member.

7. In a machine tool having a machine tool element to be moved forward from an initial position to effect a feed movement and to be returned, a rotatable member, means for driving said member selectively in either direction, a second rotatable member operatively connected to said element to effect movement of the element in a feed direction when the second rotatable member is rotated in a first direction and in a return direction when the second rotatable member is rotated in a second direction opposite to the first direction, lost motion driving means connecting the first-mentioned rotatable member to drive said second rotatable member in its said first and second directions upon rotation of the first mentioned member in different directions and said members having first and second relative angular positions when said second member is driven by the first-mentioned rotatable member in said first and second directions respectively, a rotatable power driven member, overrunning clutch means connecting said power driven member and said second rotatable member to drive said second rotatable member in its said first direction upon rotation of said power driven member and permitting said second rotatable member to overrun said power driven member in said first direction, said clutch means including control means carried by said second rotatable member and having an operative position wherein said overrunning clutch means is capable of transmitting power from said power driven member to said second rotatable member and a second position wherein said clutch means is incapable of transmitting power, means interconnecting said control means and the first-mentioned rotatable member and operable to actuate said control means to its said second and first positions when said second rotatable member and the first-mentioned member are relatively moved respectively to their said second relative angular position and a relative angular position different from said second relative angular position, and releasable means for effecting rotation of said second and the first-mentioned rotatable members as a unit when in said different relative angular position in the absence of a force applied to the first-mentioned rotatable member to oppose their rotation as a unit, said means interconnecting said control means and the first-mentioned rotatable member comprising a plurality of links which extend radially of said second rotatable member when the first-mentioned rotatable member and said second member are in their said different relative angular position and are inclined with respect to their radial positions when the first-mentioned rotatable member and said second rotatable member are in their said second relative angular position.

8. In a machine tool, the structure as defined in claim 7 wherein said control means comprises a plurality of wedge members connected to said links and carried by said second rotatable member adjacent said power driven member and wherein the clutch means further comprises a plurality of rollers interposed between a respective one of said wedge members and said power driven member and each movable on the respective wedge member between a first position permitting the overrunning of said power driven member by said second rotatable member and a second position wherein said roller is wedged between said power driven member and the respective wedge member to provide a force transmitting connection between said power driven member and said second rotatable member, and means supporting said wedge members for movement away from said power driven member to a position rendering said rollers inoperative to form a driving connection between said power driven and said second rotatable members.

9. In a machine tool, a shaft rotatable in opposite directions to move a machine tool element in opposite directions, a drive member connected to said shaft to rotate as a unit therewith, a rotatable member supported coaxially with said shaft for rotation with respect thereto, means for driving said rotatable member, lost motion drive means interconnecting said rotatable member and said drive member in driving relationship and providing relative movement between said members between relative angular driving positions upon reversal of the direction of drive therebetween, means for effecting movement of said rotatable member with said drive member when said members are in a predetermined angular position and releasable in response to an opposing force applied to said rotatable member tending to move said rotatable member in a first direction relative to said drive member, said lost motion drive means providing lost motion in said first direction from said predetermined angular position, a power driven member, overrunning clutch means connecting said power driven member to drive said drive member in a second direction opposite to said first direction, said clutch means including a clutch control member carried by said drive member, said clutch control member having a position rendering said clutch means incapable of transmitting power, and toggle link means responsive to said movement of said rotatable member relative to said drive member in said first direction to actuate said clutch control member to said position comprising a toggle link pivoted to said rotatable member and extending radially thereof when said drive member and said rotatable member are in said predetermined angular position.

10. In a machine tool including a machine tool element movable to effect relative movement between a tool and workpiece and to be moved by power in a feed direction through a work stroke from an initial position and returned, a drive member operatively connected to said element to effect movement of the latter upon movement of the drive member in a direction dependent upon the direction of movement of the drive member, a driven member, a power actuated drive for said driven member including control means actuatable to selectively effect the driving of the driven member, drive means connecting said driven member and said drive member for moving said element in a feed direction upon rotation of said driven member, second drive means connected to said drive member including a rotatable member rotatable to selectively drive the drive member in a direction to move said element in a return direction independently of the operation of said power actuated drive, and means responsive to the return movement of said element to said initial position to effect operation of said control means to engage said power actuated drive to drive said driven member to move said element in a feed direction.

11. In a machine tool, the structure as defined in claim 10 wherein said control means comprises a clutch control lever operable to engage and disengage the drive to said driven member and said means responsive to the return movement of said element to said initial position comprises cam means actuated by the return movement of said element to move said clutch control lever to a clutch engaged position.

12. In a machine tool having a machine tool element to be fed by power in one direcion from an initial position and to be returned, a first rotatable member, power actuated means operatively connected to said first rotatable member to drive it in one direction and including control means actuatable to start and stop the drive to said first rotatable member, means responsive to the return of said element to said initial position to engage said control means, a second rotatable member operatively connected to the machine tool element to be driven to drive the latter upon rotation of the second rotatable member, overrunning clutch means connecting said first rotatable member to drive said second rotatable member in a first direction upon rotation of the first rotatable member in said one direction and having a clutch operative condition wherein rotation of said first member in its said first direction is effective to drive said second member and wherein said second member can be driven in its said first direction to overrun said first rotatable member, a third rotatable member actuatable in one direction to drive said second member in its said first direction and in the opposite direction to drive said second member in a direction opposite to its said first direction, and means responsive to a force applied to said third member and tending to produce movement of said third member in its said opposite direction relative to said second member to release said clutch means.

13. In a machine tool as defined in claim 12 wherein said control means comprises a clutch control lever movable between clutch engaged and clutch disengaged positions and said means responsive to the return of said element comprises cam means actuated by the return movement of said element to move said control lever to a clutch engaged position.

14. In a machine tool having a machine tool element to be moved forward from an initial positon to effect a feed movement and to be returned to the initial position, a first rotatable member, means for driving said rotatable member, a second rotatable member operatively connected to said element to effect movement of the element in a feed direction when the second rotatable member is rotated in a first direction and in a return direction when the second rotatable member is rotated in a second direction opposite to the first direction, lost motion driving means connecting said first rotatable member to drive said second rotatable member and said members having first and second relative angular positions when said second rotatable member is driven by said first rotatable member in said first and second directions respectively, a rotatable power driven member, overrunning clutch means connecting said power driven member and said second rotatable member to drive said second rotatable member in its said first direction upon rotation of said power driven member, said clutch means including control means carried by said second rotatable member and having a position wherein said overrunning clutch means is capable of transmitting power to drive said second rotatable member in its said first direction and a second position wherein said clutch means is incapable of transmitting power, means interconnecting said control means and said first rotatable member and operable to actuate said control means to its said second and first positions when said second member and said first rotatable member are moved respectively to their said second relative angular position and a relative angular position different from said second relative angular position, and releasable means for effecting rotation of said rotatable members as a unit when in said relative angular position in the absence of a force applied to said first member to effect relative rotation therebetween in said second direction, power transmitting clutch means actuatable to selectively effect a drive to said power driven member, a lever movable between clutch engaged and clutch disengaged positions for engaging and disengaging said power transmitting clutch means, first cam means for engaging said lever and operable from a first position to an actuated position to move the lever from its clutch disengaged position to its clutch engaged position and to lock the lever in its clutch engaged position as long as the cam means is in said actuated position, follower means operatively connected to said first cam means to actuate the latter, cam actuating means carried by said element and engageable with said follower means to operate said first cam means to its said actuated position upon return movement of said element to said initial position and to its said first position after a predetermined forward movement of said element from said initial position.

15. In a machine tool, the structure as defined in claim 10 wherein said actuating cam means comprises laterally spaced abutments and said follower means comprises laterally spaced and anguarly displaced follower members connected to said first cam means to rotate as a unit therewith, each of said follower members being engaged by a respective one of said abutments.

16. In a machine tool, an indexible machine tool element movable to effect relative feed movement between a tool and workpiece and which is to be fed forward from an initial position in a feed movement and to be returned to the initial position, means for driving said element in its feed and return movements including power actuated means for actuating said element in its feed movement comprising clutch means engageable to effect the forward movement of said element, said clutch means including a control lever having a clutch disengaged position and a clutch engaged position, a cam member having a first position engageable with said lever when the latter is in said clutch disengaged position and rotatable from the first position to an actuated position to move said lever to its said clutch actuated position, said cam member being returnable to said first position from its said actuated position independently of the movement of said lever from its clutch actuated position, follower means operatively connected to said cam member to actuate the latter upon actuation of the follower means, and cam means carried by said element and disposed to actuate said follower means to move said cam member to its said actuated position upon return of said element to said initial position and to move said cam member to its said first position after a predetermined movement from said initial position in a forward direction.

17. In a machine tool, a machine tool element to be fed forwardly from an initial position and subsequently returned to the initial position, a member movably supporting said element, means for moving said element forwardly from an initial position and for returning said element to the initial position comprising power actuated means including clutch means engageable to effect movement of said element in a forward direction, a feed lever for controlling said clutch and movably supported by said member for movement between a clutch disengaged position and a clutch engaged position, a shaft supported by said member for limited rotational and axial movement with respect to said member and having a portion disposed adjacent said feed lever, a cam member fixed to said shaft and rotatable upon rotation of the shaft from an initial position to an actuated position to engage said feed lever and move the latter from a clutch disengaged position to its clutch engaged position and to lock the latter in its clutch engaged position as long as said cam is in its said actuated position, angularly and axially displaced follower members carried by said shaft, first and second abutment members carried by said element and adapted to respectively engage said first and second follower members when the latter are in a predetermined angular position, the angular displacement of said follower members being such that said first follower member is engaged during the return movement of said element when said cam member is in its initial position and actuated by the return of the element to initial position to operate said cam member to its actuated position and said second follower member is engageable upon forward movement of said element from its said initial position when said cam member is in its said actuated position and actuated by the forward movement to move the cam member to its initial position.

18. In a machine tool, a shaft rotatable in opposite directions to move a machine tool element in opposite directions, a drive member connected to said shaft to rotate as a unit therewith, a rotatable member supported coaxially on said shaft for rotation with respect thereto, means for driving said rotatable member, lost motion drive means interconnecting said rotatable member and said drive member in driving relationship and providing relative movement between relative angular driving positions upon reversal of the direction of drive therebetween, means for effecting movement of said rotatable member with said drive member when said members are in a predetermined angular position and releasable in response to an opposing force applied to said rotatable member tending to move said rotatable member in a first direction relative to said drive member, said lost motion drive means providing lost motion in said first direction from said predetermined angular position, a power driven member coaxially supported on said shaft for rotation with respect thereto, overrunning clutch means connecting said power driven member to drive said drive member in a second direction opposite to said first direction, means responsive to said movement of said rotatable member relative to said drive member in said first direction to render said overrunning clutch means incapable of transmitting power from said power driven member to said drive member, said drive member and said rotatable member being supported on said shaft for axial movement with respect thereto and said members having clutch teeth engageable by movement of said rotatable member and said drive member along said shaft in one direction to connect said power driven member and said rotatable member to said drive member for rotation as a unit therewith, and means for moving said members axially to engage said teeth including means yieldably opposing the movement of said drive and rotatable members to engage said teeth.

19. In a driving mechanism for an element, a selectively drivable first rotatable member, a second rotatable member operatively connected to the element to be driven to drive the later upon rotation of the second rotatable member, overrunning clutch means connecting said first rotatable member to drive said second rotatable member in a first direction upon rotation of said first rotatable member in a first direction, said clutch means comprising a wedge member carried by said second rotatable member adjacent said first rotatable member and a roller interposed between said wedge member and said first rotatable member and movable on said wedge member between a first position wherein said second rotatable member may overrun said first member and a second position wherein said roller is wedgeable against said wedge member to provide a force transmitting connection between said first member and said second member, means supporting said wedge member for movement away from said first member to render said roller inoperative to form a driving connection therebetween, and means for actuating said wedge member toward and away from said first member.

20. In a drive mechanism comprising a first rotatable member, a second rotatable member, said members being coaxially disposed and one of said members being disposed about the outer periphery of the other of said members, overunning clutch means interconnecting said members comprising a wedge member disposed in a slot in said first member opening into the periphery thereof adjacent said second member, said wedge member having an inclined surface facing the second member and closer to the latter at one end of the surface than at the other end of the surface, a roller in said slot disposed between said wedge member and said second member and movable on said inclined surface of said wedge member between a first position adjacent said other end of said surface and clear of said second member toward said one end of said surface to a position wherein said roller is wedged between said second member and said wedge member to provide a force transmitting connection between said first and second members, and means supporting said wedge member for movement in said slot away from said second member to a position wherein said roller is disposed clear of said second member for all positions on said surface, and means for moving said wedge member toward and away from said second member.

References Cited in the file of this patent

UNITED STATES PATENTS

| 1,576,110 | Galloway | Mar. 9, 1926 |
| 1,613,350 | Hanson | Jan. 4, 1927 |
| 2,608,109 | Hoelscher | Aug. 26, 1952 |
| 2,619,849 | Hosea | Dec. 2, 1952 |
| 2,693,731 | Mobine | Nov. 9, 1954 |

FOREIGN PATENTS

| 1,111,272 | France | Feb. 24, 1956 |